(No Model.)

C. KIESER.
DRAFT EQUALIZER.

No. 311,838. Patented Feb. 3, 1885.

WITNESSES:
Wilson Ringle,
Wm Boyden,

INVENTOR:
CHAS. KIESER,
By G. H. Boyden
Attorney.

UNITED STATES PATENT OFFICE.

CHARLES KIESER, OF BALTIMORE, MARYLAND.

DRAFT-EQUALIZER.

SPECIFICATION forming part of Letters Patent No. 311,838, dated February 3, 1885.

Application filed September 11, 1884. (No model.)

*To all whom it may concern:*

Be it known that I, CHARLES KIESER, a citizen of the United States, residing at Baltimore city, and State of Maryland, have invented certain new and useful Improvements in Draft-Equalizers, of which the following is a specification, reference being had to the accompanying drawings.

My invention relates to improvements in draft-equalizers, and has for its object, first, means by which the pull will always come on the side the resistance is the greatest; second, devices whereby the strain on the animals is gradually applied; and, third, means by which the several parts may be adjusted, &c., in case of wearing of parts, and to prevent rattling. I attain these results by mechanism illustrated in the accompanying drawings, in which—

Figure 1:
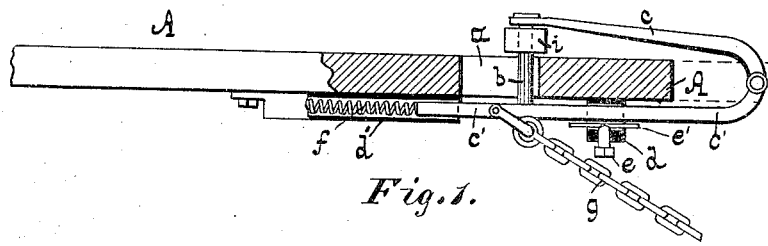
Figure 2:
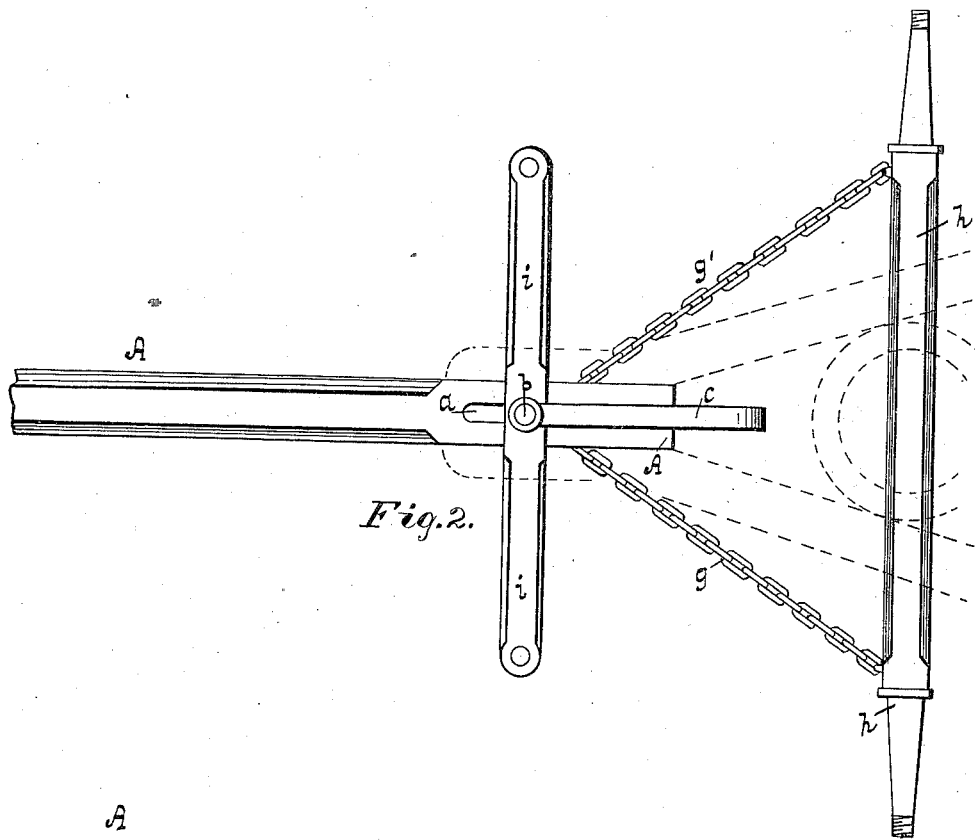

Figure 1 is a side view with the tongue in section; Fig. 2, a top view of my device, and Fig. 3 a side view showing the double-tree attached below the hounds.

Similar letters refer to similar parts throughout the several views.

The letter A designates the tongue, which is attached to the wagon by suitable hounds, &c., and is provided with a slot, $a$, through which the bolt $b$ passes, and to which is attached the double-tree $i$ in any suitable manner, the bolt $b$ connecting at either end with the yoke $c$, which has a reciprocating movement through and supported by two bearings, $d$ and $d'$, attached to the tongue, the bearing $d$ being provided with a screw, $e$, and plate $e'$, by which any wear may be taken up or rattling prevented, the other one, $d'$, consisting of a sleeve in which the spring $f$ is placed, against which the end of the bar $c'$ bears.

To the reciprocating bar $c'$ is attached two chains, $g$ and $g'$, by any suitable means, the other ends of which are attached near the extremities of the front axle, $h$, and by which the resistance is equalized.

Figure 3:
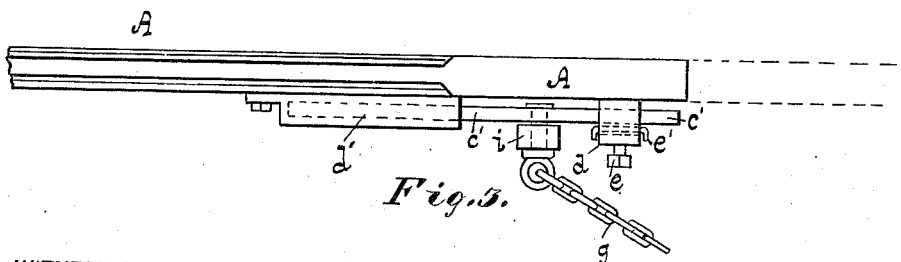

As shown in Fig. 3, the double-tree $i$ is shown attached below the tongue, which is sometimes necessary.

The operation of my device is as follows: In starting heavy-loaded vehicles the strain on the animals is gradual, as the power is first applied through the spring $f$, which prevents any sudden jar on the horses, the chains $g$ and $g'$ being sufficiently slack to permit the spring to give, and on which the strain later comes when the double-tree moves forward. As usual, when one of the wheels comes in contact with an obstacle, the opposite wheel has a tendency to move forward; but by the above arrangement this is prevented, as immediately on its doing so the whole pulling strain is applied to the end which is in contact with the obstruction, thereby applying all the power to that wheel, and as the draft is from the axle the strain is greatly lessened on the vehicle-springs, especially so in platform running-gears.

Having fully described my invention, what I claim, and wish to secure by Letters Patent, is—

1. In draft-equalizers, the combination of the chains $g$ and $g'$, the tree $i$, the spring $f$, the bar $c$, and the bearing $d$, provided with the plate $e'$ and screw $e$, as herein shown and specified.

2. The combination of the reciprocating bar $c'$ and the bearing $d$, provided with the plate $e'$ and the screw $e$, whereby the rattling may be prevented or any wear taken up.

In testimony whereof I affix my signature in presence of two witnesses.

CHARLES KIESER.

Witnesses:
 WM. BOYDEN,
 G. A. BOYDEN.